United States Patent

[11] 3,633,043

[72] Inventor Myron L. Anthony
LaGrange, Ill.

[21] Appl. No. 11,399
[22] Filed Feb. 16, 1970
[45] Patented Jan. 4, 1972

[73] Assignee Thomas E. Dorn
Clarendon, Ill.
a part interest

Continuation-in-part of application Ser. No. 851,028, Aug. 18, 1969, and a continuation-in-part of 886,054, Dec. 18, 1969. This application Feb. 16, 1970, Ser. No. 11,399

[54] CONSTANT SLEW RATE CIRCUITS
25 Claims, 16 Drawing Figs.

[52] U.S. Cl. .......... 307/230, 307/261, 307/228, 328/127, 330/85, 330/110
[51] Int. Cl. .......... G06g 7/12
[50] Field of Search .......... 307/230, 261, 228; 328/22, 27, 35, 36, 127, 128; 330/38 M, 9, 35, 85, 110

[56] References Cited

UNITED STATES PATENTS

| | | | |
|---|---|---|---|
| 2,984,788 | 5/1961 | Korff et al. | 328/35 |
| 3,138,767 | 6/1964 | Levin | 328/127 X |
| 3,231,728 | 1/1966 | Kusto | 330/85 X |
| 3,251,058 | 5/1966 | Sutcliffe | 330/110 X |
| 3,360,734 | 12/1967 | Kimball et al. | 330/85 X |
| 3,378,781 | 4/1968 | Hill | 330/85 X |
| 3,521,082 | 7/1970 | Wolk | 307/230 |

FOREIGN PATENTS

| | | | |
|---|---|---|---|
| 1,103,403 | 3/1961 | Germany | 328/27 |

OTHER REFERENCES

Kengla et al., " Active Low Pass Filter With Gain," IBM Technical Disclosure Bulletin Vol. 10, No. 3, August 1967, pp. 344–345

Picciano et al., " Electronic Integration System for WW Lovel Fast Signals," IBM Technical Disclosure Bulletin, Vol. 4, No. 12 May 1962 pp. 105,106

Todo, " Fots as Voltage-Variable Resistors," Electronic Design Sept. 13, 1965 pp. 66–68

*Primary Examiner*—Roy Lake
*Assistant Examiner*—James B. Mullins
*Attorney*—Kinzer, Dorn and Zickert

ABSTRACT: A constant slew rate circuit exhibiting essentially zero phase distortion over a substantial frequency range, comprising an integrated solid-state amplifier with a capacitor and a small, nonreactive sensing impedance connected in series from the amplifier output to ground, a low-impedance AC rate feedback circuit from the common terminal of the capacitor and the sensing impedance to the amplifier input, and a relatively high-impedance negative feedback DC stabilization circuit from the output to the input of the amplifier. With various modifications, the circuit may be used as a low-pass filter, a high-pass filter, a constant phase shift circuit, and a waveshaping circuit.

INVENTOR
MYRON L. ANTHONY

BY
Kinzer, Dorn and Zickert
ATTORNEYS

INVENTOR
MYRON L. ANTHONY

BY
Kinzer, Dorn and Zickert
ATTORNEYS

INVENTOR
MYRON L. ANTHONY

BY
Kinzer, Dorn and Zickert
ATTORNEYS

INVENTOR
MYRON L. ANTHONY
BY
Kinzer, Dorn and Zickert
ATTORNEYS

INVENTOR
MYRON L. ANTHONY
BY
Kinzer, Dorn and Zickert
ATTORNEYS

CONSTANT SLEW RATE CIRCUITS

CROSS-REFERENCES TO RELATED APPLICATIONS

This application is a continuation-in-part of application Ser. No. 851,028 filed Aug. 18, 1969, and of application Ser. No. 886,054, filed Dec. 18, 1969. The circuits disclosed and claimed in the present application find particular utility in aircraft navigation receiver apparatus of the kind disclosed and claimed in application Ser. No. 713,786, filed Mar. 18, 1968, now abandoned and superseded by application Ser. No. 54,778 filed July 14, 1970. All of the foregoing applications are in the name of Myron L. Anthony.

BACKGROUND OF THE INVENTION

There are numerous advantageous applications for a circuit that affords a constant maximum rate of change in the output signal over a wide range of rates of change for the input signal. A circuit having this general characteristic, referred to hereinafter as a constant slope or constant slew rate circuit, affords a basis for high-pass, low-pass, and band-pass filters that are especially useful in precision phase-measurement equipment because they can be constructed to afford a fixed phase shift, or zero phase shift, over a substantial frequency range and over a substantial amplitude range. For example, in a VHF omnirange radio (VOR) receiver employed for aircraft navigation, conventional high-pass, low-pass, and band-pass filters introduce substantial errors in operation because the filter circuits exhibit appreciable phase shifts with variations in the amplitude of the received signals. Moreover, conventional passive filter circuits introduce additional phase shift errors in response to variations in the fundamental frequency of the received signals; since VOR ground equipment is often dependent for its frequency control on the available power supply, navigational errors from this source are rather common. Yet another source of phase error, in conventional filter circuits, results from aging of the circuit components.

A different form of filter that has been used in VOR receivers, and that is sometimes called an "active" filter, comprises an amplifier having a tuned resistance-capacitance T-network incorporated in a negative feedback path for the amplifier. Circuits of this kind can afford an efficient band-pass filter with low noise, good stability, and high gain. However, when sidebands are present in the received signal, resulting from multipath standing waves, the sidebands are attenuated asymmetrically when the filter is not centered on the 30 Hz. data frequency characteristically used in VOR systems. This can result in substantial phase errors and may produce a rotating or oscillating phase error interpreted by the receiver as a "scallop" or "bend" in the navigation information. The difficulty is accentuated by the fact that the bridged-T amplifier filter is frequently adjusted to a point somewhat displaced from the critical 30 Hz. frequency in order to enhance its attenuation characteristics or to trap unwanted adjacent frequencies. When this is done, asymmetrical sideband attenuation also results and serious errors can be produced, even if the 30 Hz. frequency is in fact 30 Hz.

Another field in which a different but related difficulty occurs pertains to circuits requiring precision integration of an input signal. For most applications, a simple solid-state amplifier having a series resistor in its input and a capacitor connected in parallel with the amplifier produces effective and efficient operation. In this conventional integrator circuit attenuation is quite high because of the time constant required to achieve generally linear operation; the output of the circuit is never quite a true integral because of the reactive voltage divider effect of the device. The losses of the circuit are made up by additional amplification. However, while the AC gain of the integrator may be unity, the DC gain is much higher. Indeed, in a dual-stage integrator system using conventional circuits, the DC gain may be of the order of 1000 though the system has an AC gain of unity. This means that the output DC level changes markedly with slight changes in DC input or with very low-frequency changes that may be introduced into the apparatus by the power supply, bias, line surges, and the like.

SUMMARY OF THE INVENTION

It is a principal object of the present invention, therefore, to provide a new and improved functional circuit exhibiting a constant slewing rate (slope) in its output signal for a substantial range of input signals that may vary in frequency and in rate of change in amplitude.

A further object of the invention is to provide a new and improved constant slew rate circuit in which the output slew rate is essentially independent of the amplitude of the input signals to the circuit.

Another object of the invention is to provide new and improved low-pass, band-pass and high-pass filters, each incorporating a constant slew rate circuit as a principal component thereof, that afford essentially zero phase distortion over a substantial frequency range. The term "zero phase distortion," as used in this application, refers to a fixed phase relationship which may correspond to a phase shift of 0° or to a precise fixed phase shift of plus or minus 90° or of 180°.

A further object of the invention is to provide a new and improved constant slew rate circuit that is not adversely affected by aging of circuit components.

Another object of the invention is to provide a new and improved sine wave synthesizing circuit that utilizes a constant slew rate circuit in the conversion of a signal of rectangular or triangular waveform to a true sinusoidal wave.

A specific object of the invention is a new and improved constant slew rate circuit, suitable for use as a filter, a phase shifter, a rate limiter, and in a wide variety of other applications, that is simple and economical in construction yet affords precision operation without requiring precise selection of the circuit components.

Accordingly, the invention relates to a constant slew rate circuit, adapted to produce an output signal of constant linear slope upon application of a step function input signal thereto, comprising an integrated solid-state amplifier having an inverting input, a noninverting input, and an output. A capacitor is connected to the output of the amplifier and a low, nonreactive sensing impedance is connected from the capacitor to a plane of reference potential. A first feedback means, comprising an AC rate feedback circuit, is connected from the common terminal of the capacitor and the sensing impedance to one input of the amplifier. The circuit further includes second feedback means comprising a high-impedance negative feedback DC stabilization circuit that is connected from the output of the amplifier to one of its input terminals.

DESCRIPTION OF THE PREFERRED EMBODIMENTS

Figure 1:
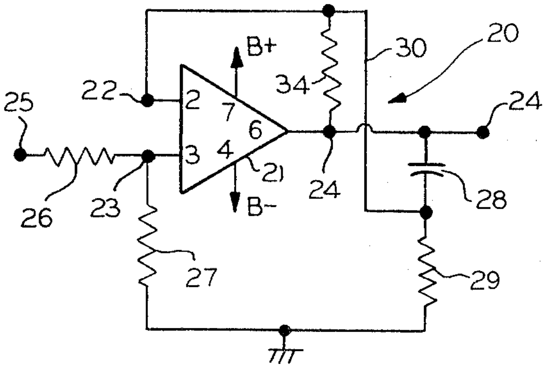
FIG. 1 is a simplified schematic drawing of a constant slew rate circuit constructed in accordance with one embodiment of the invention.

FIG. 1 illustrates a constant slew rate circuit 20, constructed in accordance with one embodiment of the present invention, that develops an output signal of constant linear slope on application of a step function input signal thereto. The constant slew rate (CSR) circuit 20 comprises an integrated solid-state amplifier 21 having an inverting input terminal 22, a noninverting input terminal 23, and an output terminal 24. Amplifier 21 is also provided with appropriate terminals for connection to a positive power supply B+ and to a negative power supply B–. Circuit 20 has an input terminal 25 connected to the noninverting amplifier input 23 by a series resistor 26. Amplifier input 23 is also connected to a resistor 27 that is returned to a plane of reference potential, here indicated as ground.

The constant slew rate circuit 20 further comprises a capacitor 28 connected to the output 24 of amplifier 21; terminal 24 also constitutes the output terminal of the complete circuit. A low, nonreactive sensing impedance comprising a small resistor 29 is connected from capacitor 28 to the ground plane of reference potential.

CSR circuit 20 includes a first feedback means comprising a rate-limiting AC feedback circuit 30 that is connected from the common terminal 31 of capacitor 28 and sensing impedance 29 back to the inverting input 22 of amplifier 21. The constant slew rate circuit 20 also includes a second feedback means comprising a negative feedback DC stabilization circuit connected from the amplifier output 24 to the inverting amplifier input 22. In the circuit of FIG. 1, this DC stabilization circuit comprises a relatively large resistor 34 connected between terminals 22 and 24.

Figure 2:
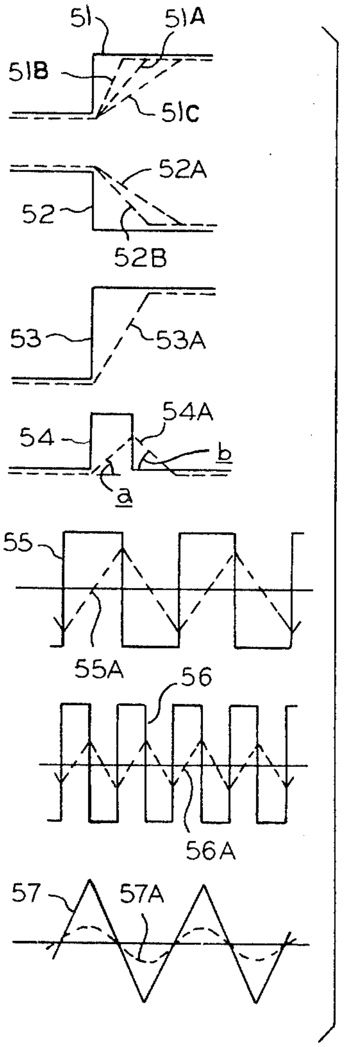
FIG. 2 is a series of input and output waveforms employed to explain the operation of the circuit of FIG. 1.

FIG. 2 comprises a series of input and output signal waveforms illustrative of operation of the constant slew rate circuit 20 of FIG. 1. In each instance, the input signal waveform is shown in solid lines, with the output signal in dash lines. The first input signal illustrated in FIG. 2 is a positive-going step function signal 51. Signal 51, when applied to the input terminal 25 of the constant slew rate circuit 20, produces an amplified signal of the same polarity at the output terminal 24 of the circuit. The positive-going voltage thus developed at output terminal 24 begins to charge capacitor 28 through the low-impedance sensing resistor 29. The voltage drop across resistor 29 is a function of the charging current through capacitor 28; this voltage drop is supplied to the inverting input 22 of amplifier 21 through the AC rate feedback circuit 30. It can be shown that the output voltage of the amplifier will be such that the voltage across sensing resistor 29 is proportional to the rate of change in amplitude of the input signal.

With a constant voltage drop across sensing impedance 29, which is in series with capacitor 28, the charging rate of capacitor 28 is a straight line function. That is, the charging rate of capacitor 28 has a constant slope or "slewing rate." The slewing rate for CSR circuit 20 is determined by the impedances of capacitor 28 and sensing resistor 29 and by the amplitude of the input voltage, signal 51. The direction of the slope depends upon the polarity of the input signal. The output signal from CSR circuit 20, in response to the step function input signal 51, is represented by the dash line 51A (FIG. 2). A decrease in the impedance of resistor 29 can be utilized to change the slope to that indicated by the dash line 51B whereas an increase in the impedance of the sensing resistor can shift the slope of the output voltage in the opposite direction to curve 51C. Corresponding changes in the slope or slewing rate of the circuit can be effected by changing the value of the capacitor 28.

In CSR circuit 20 there is a DC stabilization negative feedback circuit comprising the resistor 34. If no DC stabilization were provided, the circuit would exhibit a very high gain and the output voltage of the circuit would drift, over a period of time, toward one of the power supply voltages. The resistance circuit 34 affords reasonably effective stabilization for some applications. For the best DC stabilization, however, the resistance value must be limited, which may introduce enough AC feedback through this circuit to distort the waveform of the output signal. In those applications in which even limited distortion in the output signal cannot be tolerated, a DC feedback circuit that precludes AC feedback can be used, as discussed in connection with FIGS. 8 and 9.

When a negative-going step function is applied to the input of CSR circuit 20 (e.g., the signal 52 in FIG. 2) the operation of the circuit is as described above. The resulting output signal 52A is, again, a signal of constant linear slope. As before, a decrease in the impedance of resistor 29 affords a greater slope in the output signal, illustrated by signal 52B. An increase in the sensing resistance has the opposite effect, decreasing the output signal slope or slew rate.

The slew rate of CSR circuit 20 is dependent upon the amplitude of the input signal. Thus, a positive-going step function signal 53 (FIG. 2) produces an output signal 53A having a steeper slope (greater slew rate) than the output signal 51A produced by the input signal 51 of similar shape but lower amplitude. For some applications, this is a desirable characteristic because the slewing rate of the circuit can be adjusted by controlling the amplitude of the input signal.

When a positive-going signal pulse of rectangular waveform is applied to the input terminal 25 of the constant slew rate circuit 20 (FIG. 1), as illustrated by signal 54 (FIG. 2), the output signal produced by the circuit is a triangular pulse 54A. The slope of the positive-going portion of the triangular waveform output signal is the same as the slope of the negative-going portion, except for a reversal of 180°. That is, the angle *a* is the same as the angle *b*. Stated differently, the slewing rate for the circuit remains constant, whether the output signal changes in a positive direction or a negative direction.

A square wave signal of given frequency, such as the signal 55 (FIG. 2), when applied to the input of constant slew rate circuit 20, produces an output signal 55A of triangular waveform. The slopes of the positive-going and negative-going portions of the triangular waveform signal 55A are equal, as in the case of a single pulse described above. The output signal 55A is precisely locked in phase to the input signal 55, but with a phase retardation of 90°.

An input signal 56 of rectangular waveform, having the same amplitude but at twice the frequency of signal 55, may be supplied to CSR circuit 20, and again produces an output signal 56A of triangular waveform. The slewing rate for signal 56A, corresponding to the slopes of the positive and negative-going portions of the signal, is the same as for signal 55A. However, the amplitude of the output signal 56A is not as great as signal 55A because the available time for each change of signal polarity is only one-half that previously available. As before, the output signal 56A for circuit 20 is retarded 90° in phase as compared to input signal 56.

Another interesting and useful characteristic of CSR circuit 20 is illustrated in the final set of input-output curves in FIG. 2. As shown therein, an input signal 57 of triangular waveform, applied to the CSR circuit, produces an output signal 57A of sinusoidal waveform. Thus, the CSR circuit is potentially useful and valuable in analog computers and similar applications, such as the area navigation computer disclosed in the aforementioned application Ser. No. 851,028. This use of the CSR circuits of the present invention is discussed more fully hereinafter in connection with FIG. 10.

Figure 3:
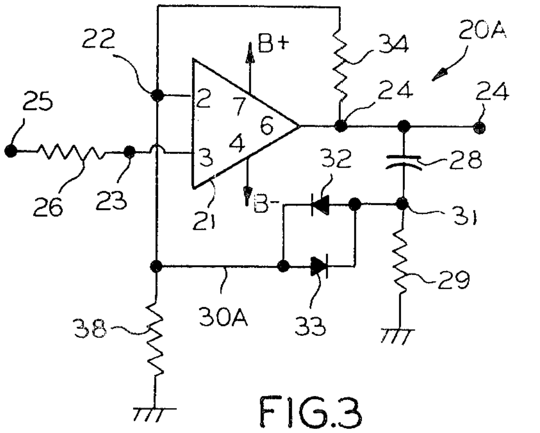
FIG. 3 is a simplified schematic diagram of a modification of the circuit of FIG. 1.

FIG. 3 illustrates a constant slew rate circuit 20A that is basically similar to the CSR circuit 20 of FIG. 1, except for the rate-limiting feedback circuit. Thus, CSR circuit 20A comprises an integrated-circuit solid-state amplifier 21; the input terminal 25 for CSR circuit 20A is connected to the noninverting input terminal 23 of the amplifier by a series resistor 26. A capacitor 28 is connected to the output terminal 24 of amplifier 21, which constitutes the output terminal of the circuit. A sensing resistor 29 is connected from capacitor 28 to reference ground. As before, the DC stabilization feedback circuit comprises a resistor 34 connected from output terminal 24 back to the inverting input 22 of amplifier 21.

The AC rate-limiting feedback means, in CSR circuit 20A, is a circuit 30A connecting the common terminal 31 of capacitor 28 and sensing resistor 29 back to the inverting input terminal 22 of amplifier 21. Feedback circuit 30A includes a pair of diodes 32 and 33 connected in parallel with each other in opposed polarization; the parallel combination of the diodes is connected in series in the rate-limiting feedback circuit. A resistor 38 is connected from terminal 22 to system ground. Diodes 32 and 33 establish a threshold level for the operation of the circuit in limiting the slewing rate of the output signal, as described hereinafter.

The operation of CSR circuit 20A (FIG. 3) is basically similar to that of CSR circuit 20 (FIG. 1) as described above; the foregoing operational description based on the waveforms of FIG. 2 is generally applicable. However, the diodes 32 and 33 in feedback circuit 30A do introduce certain operating differences between the two CSR circuits. The principal difference is that the diodes 32 and 33 establish a threshold for the rate-limiting feedback signal; slowly changing signals that never exceed this threshold (the forward diode voltage drop) are amplified in circuit 20A without substantial modification in waveform.

Thus, for CSR circuit 20A, a slowly changing sinusoidal input signal 58 (FIG. 4), basically a signal of low frequency and low amplitude, is reproduced by the circuit as a similar low-amplitude low-frequency sine wave 58A; there is no change of phase. Similarly, a low-amplitude low-frequency signal 59 of triangular waveform is translated through CSR circuit 20A without appreciable change in waveform or in phase, resulting in the output signal 59A. This does not result in the establishment of a true low-frequency cutoff for the CSR circuit 20A; a low-frequency input signal that has a high rate of change in amplitude produces an output signal that is rate limited. Thus, a low-frequency square wave input signal 61 produces a triangular wave output signal 61A. The diodes 32 and 33 introduce a minor variation in the rate-limited triangular output waveform, due to the forward voltage drops of the diodes, as shown in exaggerated form at 62 in FIG. 4. This variation can be accepted with no difficulty in some applications; in others, compensation may be desirable. In particular, at higher frequencies the small square wave introduced into the output signal by the diode drop 62 may cause some difficulty. An effective compensation circuit is discussed hereinafter in connection with FIG. 16.

Figure 5:
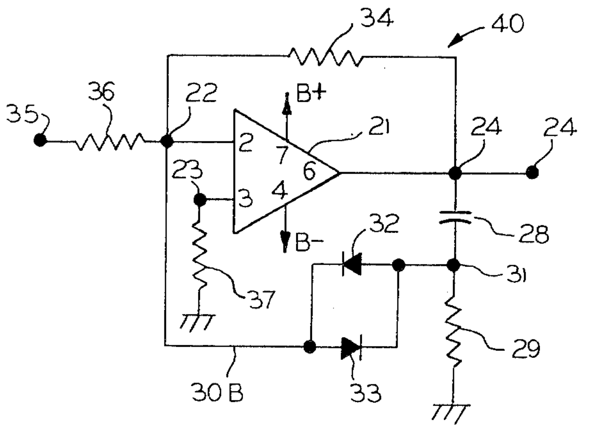
FIG. 5 is a simplified schematic illustration of a constant slew rate circuit constructed in accordance with another embodiment of the invention.

FIG. 5 illustrates another constant slew rate (CSR) circuit 40 constructed in accordance with a different embodiment of the present invention. CSR circuit 40 comprises an integrated solid-state amplifier 21 having an inverting input 22, a noninverting input 23, and an output 24 that constitutes the output terminal for the complete circuit. The input terminal 35 for CSR circuit 40 is connected by a series resistor 36 to the inverting input 22 of amplifier 21. The noninverting input 23 of amplifier 21, in this embodiment, is connected to system ground through a resistor 37.

In CSR circuit 40, a capacitor 28 is connected from output terminal 24 to a resistor 29 that is returned to system ground. The common terminal 31 of capacitor 28 and resistor 29 is connected in a first feedback circuit 30B that extends from terminal 31 back to the inverting input terminal 22 of amplifier 21. This is an AC rate-limiting feedback circuit that includes, in series, the parallel combination of two diodes 32 and 33, as in the previous circuit 20A (FIG. 3). Furthermore, CSR circuit 40 includes a second feedback means, comprising a resistor 34 connected from output terminal 24 to inverting input 22, affording a negative feedback DC stabilization circuit and gain adjustment for amplifier 21.

Figure 6:
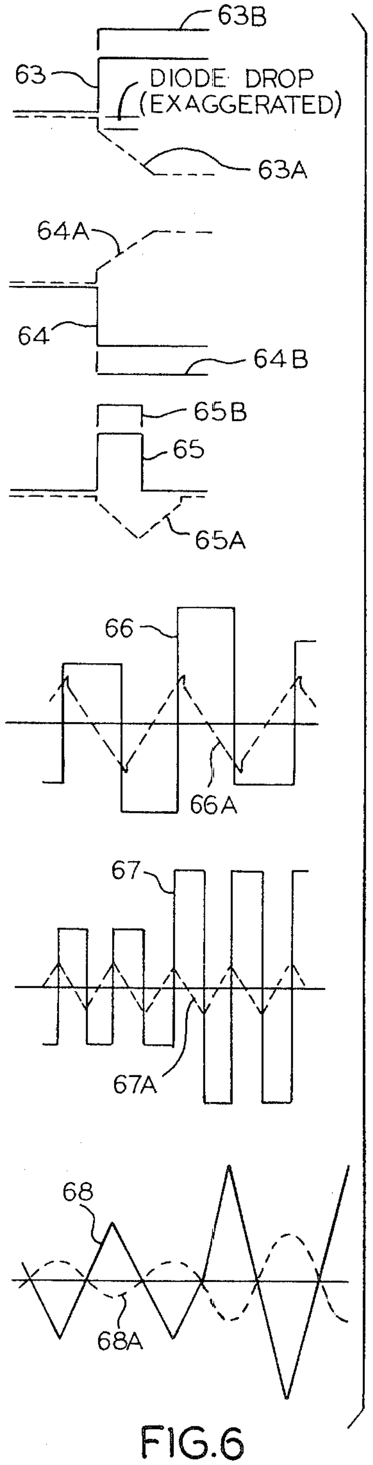
FIG. 6 comprises a series of illustrations of input and output waveforms utilized to explain the operations of the circuit of FIG. 5.

The operation of CSR circuit 40 (FIG. 5) is generally similar to circuits 20 and 20A. As shown in FIG. 6, a positive-going step function input signal 63, when applied to input terminal 35 of CSR circuit 40 (FIG. 5), produces a negative-going output signal at the output terminal 24 of the CSR circuit, because input terminal 35 is connected to the inverting input 22 of amplifier 21. The output voltage again begins to charge capacitor 28 through the low-value sensing resistor 29, producing a voltage drop across resistor 29 that is a function of the charging current. The signal across resistor 29 is applied to the inverting input 22 of amplifier 21 through the AC rate feedback circuit 30B. As in circuit 20A, the voltage across resistor 29 must exceed the forward voltage drop 62 across the diodes 32, 33 before there is an effective limitation on the rate of change of the output signal. Once the drop across resistor 29 exceeds this threshold, the gain of the circuit is such that the voltage across resistor 29 exactly matches the diode drop. Consequently, the charging rate of capacitor 28 is a straight line function, and the CSR circuit 40 produces an output signal 63A having a constant, limited slope or slewing rate.

In CSR circuit 40, as in circuits 20 and 20A, the slewing rate is controlled by the impedance values of capacitor 28 and resistor 29. However, unlike circuits 20 and 20A the rate-limiting operation of circuit 40 is essentially independent of the amplitude of the input signal. Thus, if the amplitude of the input signal increases, as indicated by signal 63B, the slope of the output signal 63A remains unchanged.

When a negative-going step function signal 64 is applied to the input of CSR circuit 40, the output signal of the circuit is a signal 64A of constant linear slope. However, the output signal is a positive-going signal, due to the inversion characteristics of circuit 40. Again, if the amplitude of the input signal is increased, as indicated by signal 64B, the slope of the output signal 64A remains unchanged.

When a positive-going signal pulse 65 of rectangular waveform is applied to the input terminal 35 of the CSR circuit 40 (FIG. 5) the output signal produced by the circuit is a negative-going pulse of triangular waveform as shown by signal 65A in FIG. 6. The slopes of the positive-going and negative-going portions of the triangular pulse 65A are the same, just as in the case of the circuits 20 and 20A described above. That is, the slewing rate for the circuit remains constant for signal changes in both positive and negative directions. Furthermore, the amplitude of the input signal can change to a great extent without affecting the output signal, as long as the amplitude exceeds a given minimum level. Thus, the output signal 65A can also be produced by an input signal 65B of much greater amplitude.

A square wave signal of fixed frequency but varying amplitude, such as the signal 66, (FIG. 6), when applied to the input of CSR circuit 40, produces an output signal 66A of triangular waveform. The slopes of the negative-going and positive-going portions of the triangular waveform signal 66A are equal, just as in the case of the single pulse described above. The output signal 66A is precisely related in phase to the input signal 66, with a phase advancement of 90°. This compares with the 90° phase retardation effected in the previously described circuits 20 and 20A, as may be seen by a comparison of curves 66 and 66A (FIG. 6) with curves 55 and 55A (FIG. 2).

If the input signal frequency is doubled, as illustrated by waveform 67 in FIG. 6, circuit 40 again produces an output signal 67A of triangular waveform. The slewing rate (slope) for signal 67A is the same as for signal 66A. However, the amplitude of the output signal 67A is not as great as for signal 66A because of the increase in frequency. As before, the slewing rate and amplitude of the output signal are both essentially independent of the amplitude of the input signal.

The final set of input and output curves in FIG. 6 illustrates the operation of CSR circuit 40 for an input signal 68 of triangular waveform having a constant frequency but a variable amplitude. The resulting output signal 68A is a sine wave of low harmonic distortion. However, the amplitude of the sine wave output signal 68A does change in response to changes in the amplitude of the input signal, because the amplitude changes are accompanied by corresponding variations in the rate of change of the input signal.

Figure 4:
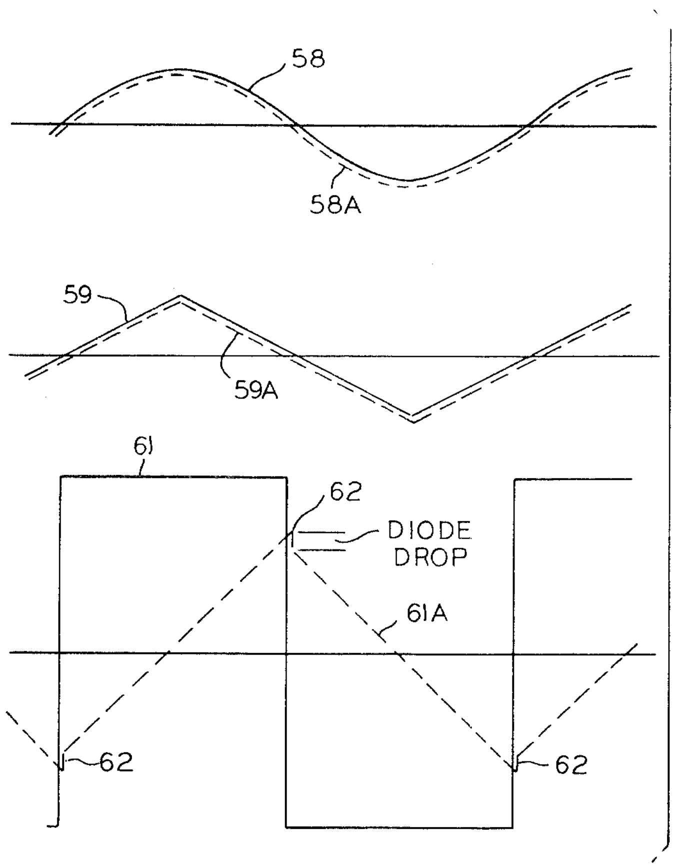
FIG. 4 is a series of input and output waveforms used to explain the operation of the circuit of FIG. 3.

In the operation of CSR circuit 40, as in circuit 20A, there is no rate-limiting feedback signal from the sensing circuit comprising capacitor 28 and resistor 29 until the voltage drop across resistor 29 exceeds the forward voltage drop across one of the diodes 32 and 33. Consequently, a signal that has a low rate of change is not modified in its waveform; for slow-changing input signals, CSR circuit 40 constitutes a simple amplifier. Thus, if a low-frequency low-amplitude signal is supplied to constant slew rate circuit 40, the resulting output signal will be a faithfully amplified reproduction of the input signal, but with a 180° change in phase. Thus, the waveforms 58, 58A, 59 and 59A of FIG. 4 are applicable to CSR circuit 40 (FIG. 5) as well as to CSR circuit 20A (FIG. 3), except that the output signals from circuit 40 are inverted in phase relative to the input signals.

CSR circuits 20 and 20A (FIGS. 1 and 3) are integrators, but CSR circuit 40 is a nonintegrating circuit. The outputs of circuits 20 and 20A, for AC signals having a high-slewing rate, are retarded 90° in phase, whereas the output of circuit 40 is advanced 90°. But both types of CSR circuit afford an effective and consistent slew rate limiting action that remains constant over a substantial frequency range and is essentially independent of aging of components.

To afford a more explicit example of the CSR circuits 20A and 40 of FIGS. 3 and 5, specific circuit parameters are set forth hereinafter. This information is presented solely by way of illustration and in no sense as a limitation on the invention.

| | |
|---|---|
| Resistors 26, 36, 37, 38 | 10 kilohms |
| Capacitor 28 | 1 microfarad |
| Resistor 29 | 680 ohms (variable) |
| Resistor 34 | 330 kilohms |
| Amplifier 21 | uA741 Fairchild |
| Diodes 32, 33 | IN914 |

Figure 7:
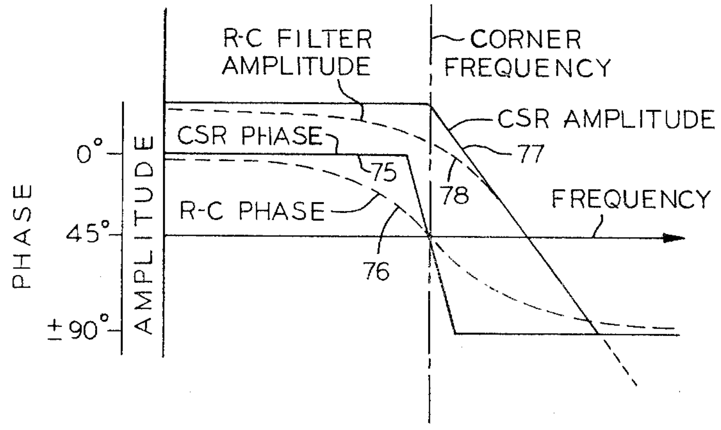
FIG. 7 is a graphic illustration of the general phase shift and attenuation characteristics of the circuits of FIGS. 1, 3 and 5.

With these circuit parameters, and with resistor 29 adjusted to 220 ohms, the cutoff frequency for the circuits, as low-pass filters (see FIG. 7) is 60 Hz.

For all practical purposes, the response characteristics of the constant slew rate circuits 20A and 40 correspond to those of a servosystem having a maximum slewing rate imposed by the top speed of the servomotor, but with the important difference that the CSR circuits exhibit essentially zero inertia. The analogy is enhanced by the use of the threshold diodes 32, 33 in the rate-limiting feedback means of the CSR circuits 20A and 40; the diodes avoid introduction of time delay and establish a fixed, known threshold for the slew rate limitation imposed on the output signal.

The attenuation characteristics for each of the circuits described above are those of a low-pass filter, being 6 db. per octave. Phase characteristics of these circuits, particularly circuits 20A and 40, are highly suitable for an application, such as a VOR receiver, in which absolute phase fidelity is essential. The phase shift characteristics for the CSR circuits 20A and 40 correspond to those shown in FIG. 7 by the solid line curve 75. It can be shown that for both circuits the phase shift is zero below a given corner or cutoff frequency, determined by the impedance values of capacitor 28 and resistor 29. Above the corner frequency, the phase shift is exactly 90°, with the sign of the phase shift depending upon which of the two CSR circuits 20A and 40 is used. Over a very limited transition range extending on both sides of the corner frequency, the phase shift is a function of the input frequency.

In contrast, a conventional resistance-capacitance filter exhibits a gradual change of phase, with changes in input frequency, of a nonlinear nature, both above and below the cutoff or corner frequency for the filter, as shown by curve 76. Indeed, for even a high-quality resistance-capacitance filter there is a substantial phase shift that may be of the order of 1° even at one decade below the corner frequency and that is subject to variation with even minute frequency changes. Phase variations of this kind cannot be tolerated in precision navigation applications, such as in VOR receivers, or in other applications having similar precision requirements. The attenuation characteristics for the CSR filter and the conventional resistance-capacitance filter, as shown by curves 77 and 78, exhibit the same kind of differences. The attenuation by the conventional passive resistance-capacitance filter can only approach zero and always produces the phase variations discussed above. Moreover, a passive R-C filter always exhibits at least some phase shift, regardless of circuit parameters, with changes in circuit component values and environmental conditions. These phase shifts are eliminated in the CSR circuits of the present invention.

Figures 8, 9, 12:
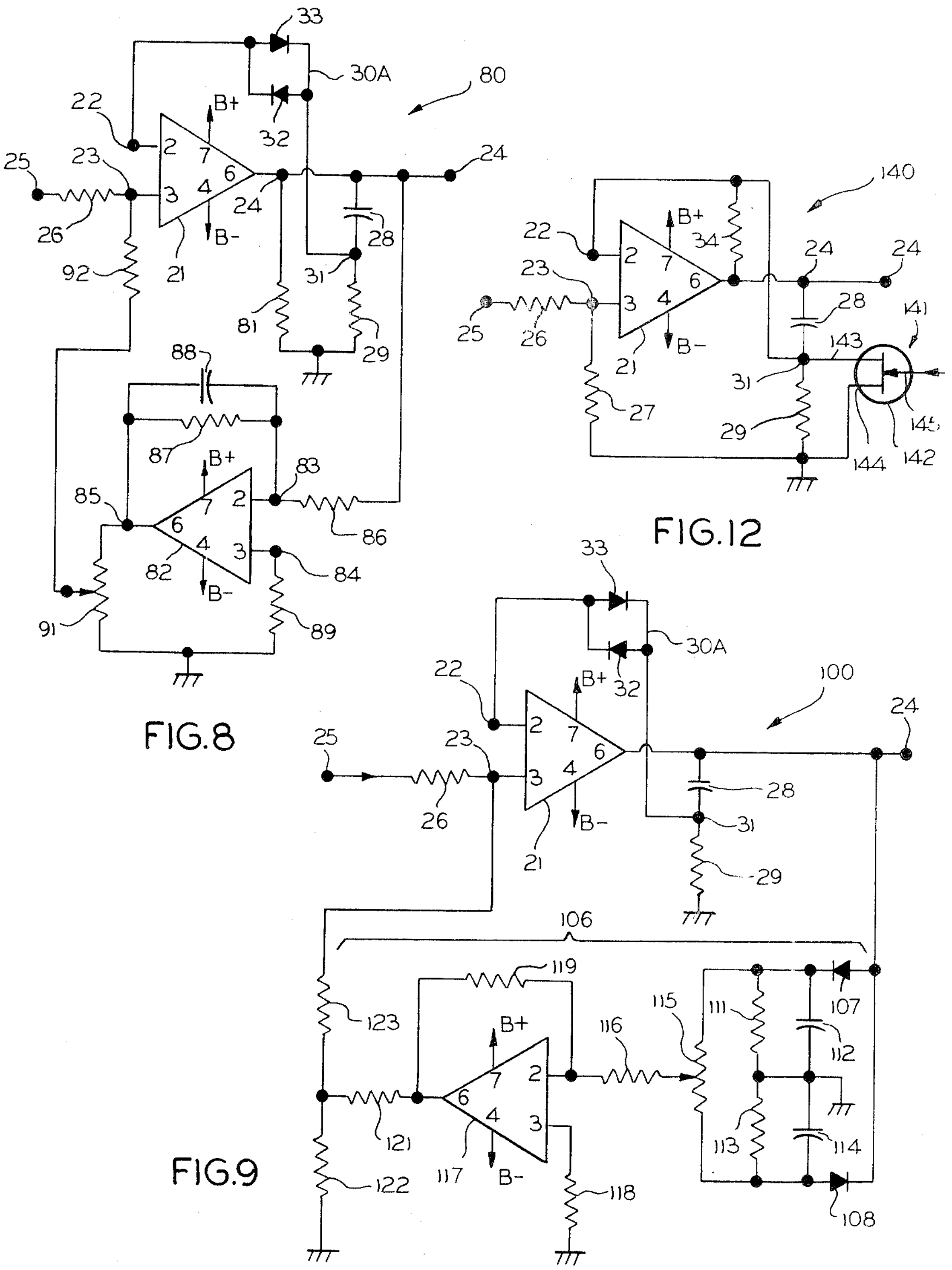
FIGS. 8 and 9 illustrate constant slew rate circuits constituting additional embodiments of the invention.
FIG. 12 illustrates another embodiment of the present invention with a provision for signal control of the slewing rate of the circuit.

FIG. 8 illustrates a constant slew rate circuit 80 that is generally similar to the circuit 20A of FIG. 3, in many respects, but that includes a substantially different DC stabilization feedback circuit. Thus, CSR circuit 80 comprises an integrated solid-state amplifier 21 having an inverting input terminal 22, a noninverting input 23, and an output 24. The input to circuit 80 is supplied at a terminal 25 that is connected to the noninverting input 23 of amplifier 21 by a resistor 26. The amplifier output 24 is connected to a capacitor 28 that is in turn connected to a low-impedance sensing resistor 29, resistor 29 being returned to ground. A rate-limiting feedback connection is provided by a circuit 30A that extends from the common terminal 31 of capacitor 28 and resistor 29 through the diode pair 32 and 33 to the inverting input 22 of amplifier 21. A relatively large load resistor 81 is connected from the output terminal 24 to ground.

In CSR circuit 80, the DC stabilization negative feedback circuit comprises an integrated solid-state amplifier 82 having an inverting input 83, a noninverting input 84, and an output 85. The inverting input 83 is connected to the output terminal 24 of the CSR circuit by means of a resistor 86. A parallel R-C circuit comprising a resistor 87 and a capacitor 88 is connected between amplifier terminals 83 and 85. The noninverting input 84 of amplifier 82 is connected to a resistor 89 that is returned to ground. The output terminal 85 of amplifier 82 is connected to one end of a potentiometer 91, the other end of the potentiometer being returned to ground. The tap on potentiometer 91 is connected back to the input 23 of the amplifier 21 through a series resistor 92.

The basic operation of the CSR circuit 80 of FIG. 8 corresponds in all essential respects to that described above for circuit 20A of FIG. 3. In CSR circuit 80, the DC stabilization feedback circuit includes the amplifier 82, which is connected as an inverting amplifier. It is for this reason that the stabilization feedback return is made to the noninverting input 23 of the amplifier 21 in the main portion of the CSR circuit. Amplifier 82 functions as a low-pass filter, eliminating much of the AC feedback that can occur in a resistance circuit as used in the previously described embodiments. Consequently, CSR circuit 80 provides a reduction in subharmonic distortion, a useful characteristic in many applications. CSR circuit 80 also affords a convenient means for adjustment of the amplitude of the DC feedback signal, by means of potentiometer 91. But the basic rate-limiting feedback circuit that provides the essential constant slew rate operating characteristic remains unchanged and affords operational characteristics similar to the earlier circuits.

To afford a more detailed and specific example of a particular embodiment of the present invention, specific circuit parameters for the CSR circuit 80 of FIG. 8 are set forth below. It should be understood that these data are provided merely by way of illustration and in no sense as a limitation on the invention.

Resistors

| | |
|---|---|
| 26 | 150 kilohms |
| 29 | 10 ohms |
| 81 | 5.6 kilohms |
| 86 | 22 kilohms |
| 87 | 47 kilohms |
| 89 | 10 kilohms |
| 91 | 1,000 ohms |
| 92 | 1 kilohm |

Capacitors

| | |
|---|---|
| 28 | See table I |
| 88 | 10 microfarads |

Semiconductor Devices

| | |
|---|---|
| 21, 82 | uA741 Fairchild |
| 32, 33 | IN270 |

The cutoff frequency of the CSR circuit is determined primarily by the capacitance of capacitor 28 and the impedance of the sensing resistor 29, these circuit parameters also constituting the determining factor for the slewing rate of the circuit. To afford a more complete illustration of the effect of changes in one of these parameters on the operating characteristics of the circuit, the CSR circuit 80 of FIG. 8 has been tested for a range of 10 different values for capacitor 28, with the results set forth in table I below. For these tests, the input signal supplied to input terminal 25 of CSR circuit 80 was an AC signal having a peak-to-peak voltage of 24 volts. In the test circuit, the diodes 32 and 33 were not employed.

Table I

| Capacitor 28 (microfarads) | Voltage V29 (volts peak-to-peak) | Slewing Rate (Volts per millisecond) | Cutoff Frequency (Hertz) |
|---|---|---|---|
| 1 | 80 | 4.00 | 99 |
| 2 | 80 | 2.00 | 50 |
| 3 | 80 | 1.28 | 34 |
| 4 | 80 | 1.00 | 25 |
| 5 | 80 | 0.80 | 20 |
| 6 | 80 | 0.65 | 17 |
| 7 | 80 | 0.55 | 15 |
| 8 | 80 | 0.48 | 13 |
| 9 | 80 | 0.44 | 11 |
| 10 | 80 | 0.40 | 10 |

FIG. 9 illustrates a constant slew rate circuit 100 that is again basically similar to CSR circuit 20A of FIG. 3 but with a substantial modification of the DC stabilization feedback circuit. Thus, CSR circuit 100 includes a main integrated semiconductor amplifier 21 having an inverting input 22 and a noninverting input 23 with an input circuit comprising an input terminal 25 connected by a series resistor 26 to the amplifier input 23. The output terminal 24 of amplifier 21 is connected to a capacitor 28 and is returned to ground through a small metering resistance 29. The common terminal 31 of capacitor 28 and resistor 29 is connected to the inverting input 22 of amplifier 21 by a rate-limiting feedback circuit 30A comprising the parallel combination of the two diodes 32 and 33.

The output terminal 24 is connected back to the noninverting input of amplifier 21 by a DC and low-frequency stabilizing feedback circuit 106. The feedback circuit 106 includes a pair of oppositely oriented diodes 107 and 108 connected to output terminal 24. Diode 107 is connected to one end of a potentiometer 115 and is bypassed to ground through a capacitor 112, a resistor 111 being connected in parallel with capacitor 112. Similarly, diode 108 is connected to the other end of potentiometer 115 and is returned to ground through the parallel combination of a resistor 113 and a capacitor 114.

The tap on potentiometer 115 is connected to a series input resistor 116 that is in turn connected to the inverting input terminal of a solid-state integrated amplifier 117. The noninverting input terminal of amplifier 117 is returned to ground through a resistor 118. The output terminal of amplifier 117 is connected to a resistor 119 that is connected back to the inverting input of amplifier 117. The output terminal of amplifier 117 is also connected to a resistor 121 that is in turn connected to the center terminal of a voltage divider comprising a resistor 122 that is returned to system ground and a resistor 123 that is connected back to the noninverting input 23 of amplifier 21.

The basic operation of the CSR circuit 100 of FIG. 9 corresponds to that described above for the CSR circuit 20A of FIG. 3. However, the DC and low-frequency stabilization feedback circuit 106 afford somewhat more effective operation than the simple DC feedback circuit afforded by the resistor 34 in the initial embodiment, or even the more sophisticated feedback circuit of FIG. 8, by effectively precluding AC feedback to the main amplifier 21 through the DC feedback circuit. Thus, the DC stabilization circuit 106 provides improved immunity to distortion in the output circuit when utilized in an integrator or wave-shaping filter, particularly in a dual-integration filter circuit utilized to convert a square wave to a sinusoidal wave as described below in connection with FIG. 10.

To afford a more concrete illustration of the particular embodiment of the invention illustrated in FIG. 9, specific circuit parameters for a typical example of that circuit are set forth below. Again, these circuit values are set forth merely by way of illustration and in no sense as a limitation on the invention.

Resistors

| | |
|---|---|
| 26, 111, 113 | 150 kilohms |
| 29, 122 | 100 ohms |
| 115 | 1 megohm |
| 116, 119 | 47 kilohms |
| 118 | 10 kilohms |
| 121, 123 | 1 kilohm |

Capacitors

| | |
|---|---|
| 28 | 1 microfarad |
| 112, 114 | 4 microfarad |

Semiconductor Devices

| | |
|---|---|
| 32, 33, 107, 108 | IN270 |
| 21, 117 | uA741 Fairchild |

Figure 10:
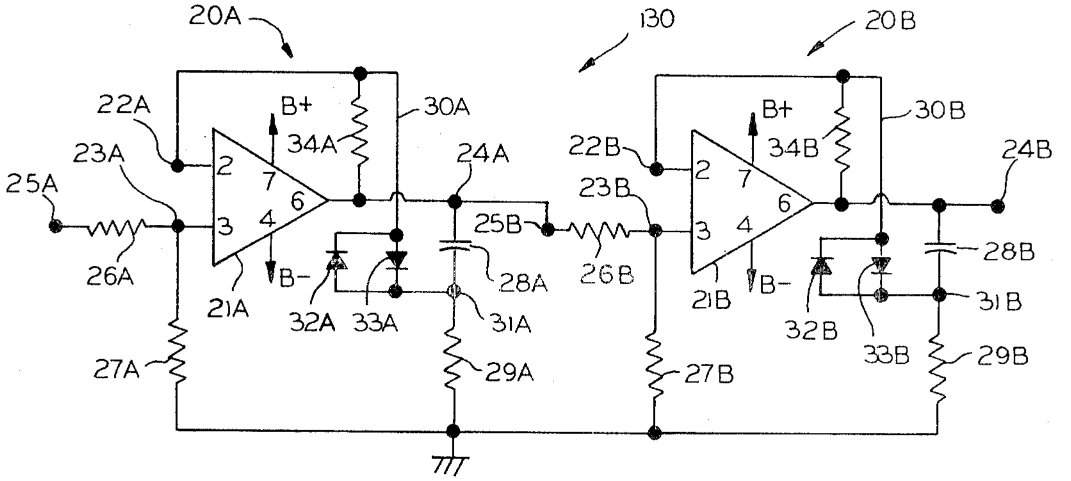
FIG. 10 illustrates a dual integrator and wave-shaping circuit utilizing the constant slew rate circuit of FIG. 3.

FIG. 10 illustrates a dual-integrator system 130 employing two constant slew rate circuits constructed in accordance with the present invention. The initial CSR circuit 20A corresponds to the construction illustrated in FIG. 3, and this is also true of the second CSR circuit 20B. The two CSR circuits 20A and 20B are connected together in series with the output terminal 24A of CSR circuit 20A directly connected to the input terminal 25B of CSR circuit 20B. The input signal to the dual integrator 130 is supplied to the input terminal 25A of the initial CSR integrator 20A and the output signal is taken from the output terminal 24B of the second CSR integrator 20B. The internal components of the individual circuits are identified by the same reference numerals as employed in FIG. 3 except that the letter designations A and B have been added to all component reference numerals in FIG. 10 to aid in distinguishing between the two stages 20A and 20B.

The dual stage CSR circuit 130 illustrated in FIG. 10 is particularly useful in analog computers and other applications in which a noisy input signal must be converted into a clean signal of sinusoidal waveform, as in the navigation computer described in the aforementioned copending application Ser. No. 851,028. In an application of this kind, the received signal is utilized to develop an input signal of rectangular waveform, such as the signal 131 (FIG. 11); the conversion to a square wave signal can be accomplished by means of an appropriate limiter circuit or a zero-crossing detector. The square wave signal 131, applied to input terminal 25A, produces a signal 132 of triangular waveform, having a phase displacement of 90° relative to signal 131, at the output terminal 24A of the first CSR circuit 20A. The triangular waveform signal 132, applied to the input terminal 25B, causes the second CSR circuit 20B to develop a clean sinusoidal output signal 133 at the output terminal 24B of dual-integrator system 130.

Figures 14, 15:
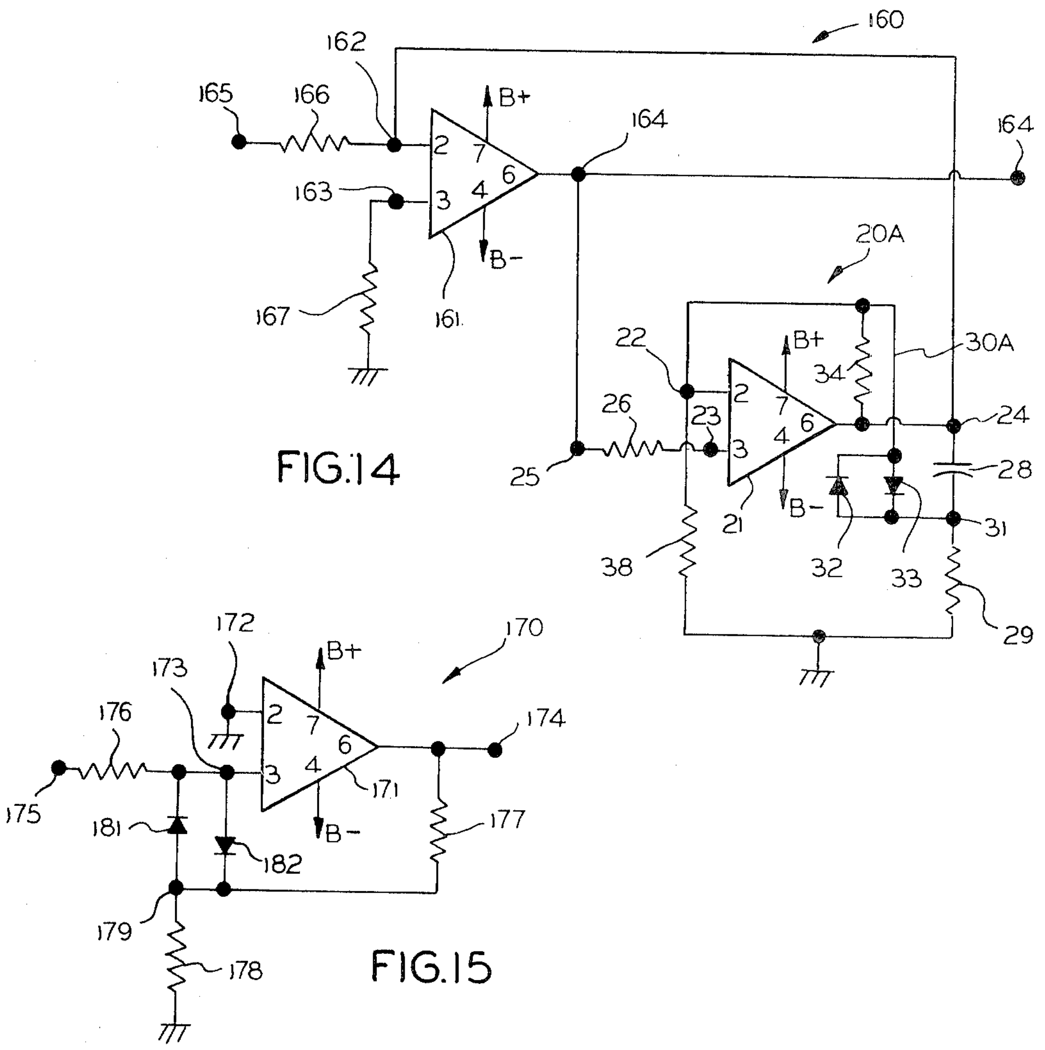
FIG. 14 illustrates a wave-shaping filter that may be used with a constant slew rate circuit constructed in accordance with the present invention in a particular computing operation.
FIG. 15 illustrates a differentiator and high-pass circuit utilizing a constant slew rate circuit constructed in accordance with the present invention.

In many applications, particularly those where about 1 percent harmonic distortion can be tolerated in the sinusoidal output signal 133, the basic simple circuits illustrated in FIG. 10 can be utilized. In other applications, where extremely close adherence to a true sinusoidal wave must be obtained throughout the system, somewhat more sophisticated CSR circuits such as those described above in connection with FIGS. 8 and 9, or the further embodiments of the invention illustrated in FIGS. 13 and 16 may be employed. Of course, the inverting CSR circuit 40 of FIG. 5 can also be incorporated in a dual stage system such as that shown in FIG. 10; circuit 40 is particularly advantageous when it is difficult to avoid variations in the amplitude of the input signal. Yet another effective modification of the dual-integrator circuit 130 that is useful in some applications is the provision of a somewhat different wave-shaping filter as the output circuit of the system, instead of the CSR circuit 20B. An appropriate wave-shaping filter suitable for this use is illustrated in FIG. 15.

In some systems it may be desirable to provide an effective means for varying the slewing rate of the constant slew rate circuit in accordance with changes in some external phenomenon. This can be accomplished by providing some means for signal control of the effective capacitance or of the sensing impedance in the basic CSR circuit. This modification of the invention, with a provision for signal control for adjustment of the sensing impedance, is generally illustrated by the constant slew rate circuit 140 of FIG. 12.

CSR circuit 140 (FIG. 12) is generally similar to CSR circuit 20 (FIG. 1) and comprises an integrated solid-state amplifier 21 having an inverting input 22, a noninverting input 23, and an output 24 that constitutes the output terminal for the CSR circuit. As before, the input terminal 25 of the circuit is connected to the noninverting input 23 of amplifier 21 by means of a series resistor 26, input 23 also being returned to ground through a resistor 27. The output 24 of amplifier 21 is connected to a capacitor 28 that is returned to ground through a sensing impedance comprising a resistor 29. The common terminal 31 of capacitor 28 and resistor 29 is connected in a rate-limiting feedback circuit to the inverting input 22 of the amplifier. A DC stabilization feedback circuit is provided by a resistor 34 connected from output 24 back to the inverting input 22 of amplifier 21.

CSR circuit 140 further includes a signal-controlled means 141 for changing the effective sensing impedance in the rate-limiting feedback circuit for amplifier 21. This signal-controlled means 141 comprises a field effect or bipolar transistor 142 having two main electrodes 143 and 144 and a gate electrode 145. The main electrodes 143 and 144, constituting the input and output electrodes of transistor 142, are connected to terminal 31 and to the ground plane of reference potential, respectively, thus placing the input and output electrodes of the transistor in parallel with sensing resistor 29. The gate electrode 145 is utilized as a control signal input to vary the conductivity of transistor 142 and thereby vary the effective total impedance between capacitor 28 and the ground plane. Thus, CSR circuit 140 provides a convenient and effective means for adjusting the slewing rate and the cutoff frequency for CSR circuit 140 in accordance with some external phenomenon as represented by a control signal supplied to the control electrode 145 of transistor 142. Of course, a similar signal-controlled means for changing the effective impedance can be applied to any of the other CSR circuits described above.

Figures 11, 13:
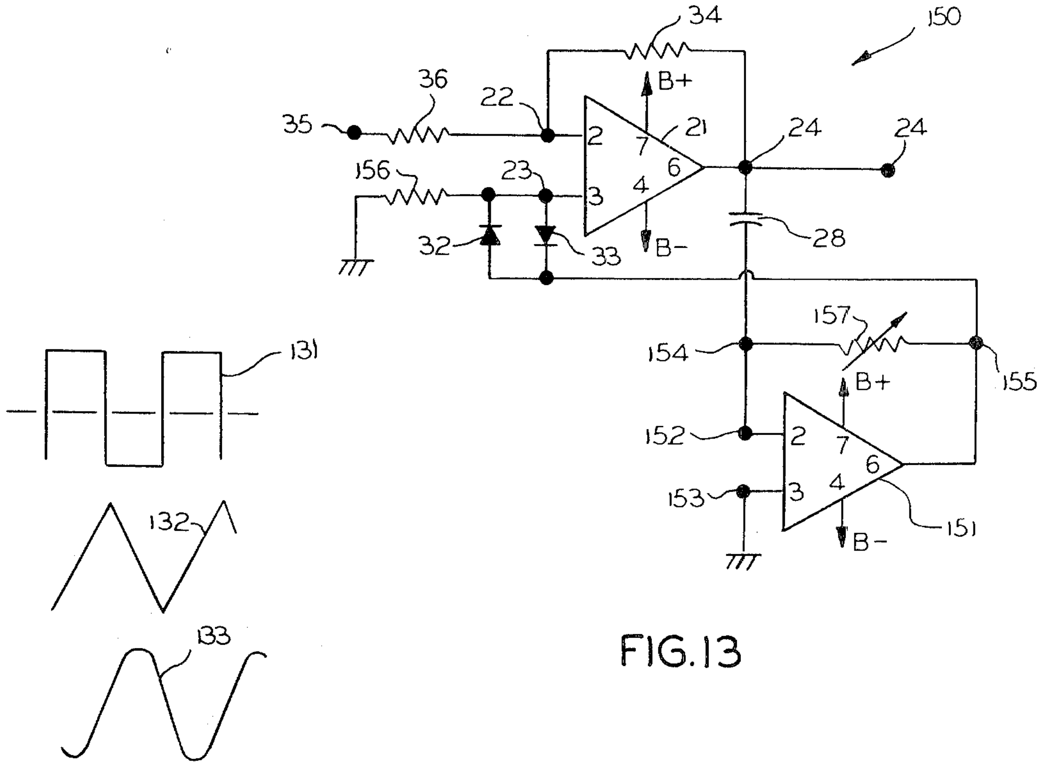
FIG. 11 illustrates waveforms at designated terminals in FIG. 10.
FIG. 13 illustrates yet another embodiment of the constant slew rate circuits of the present invention.

FIG. 13 illustrates a constant slew rate circuit 150 constructed in accordance with a further embodiment of the present invention. CSR circuit 150 is basically similar to the CSR circuit 40 of FIG. 5 in many respects. It comprises an integrated amplifier 21 having an inverting input 22, a noninverting input 23 and an output 24 that comprises the output terminal for the CSR circuit. The input terminal 35 of CSR circuit 150 is connected to the inverting input 22 of amplifier 21 by a series resistor 36. As before, there is a DC stabilization negative feedback circuit comprising a resistor 34 connected from output terminal 24 back to the inverting input 22 of amplifier 21.

The rate-limiting AC feedback circuit, and particularly the sensing impedance utilized to develop the rate-limiting feedback signal, however, is substantially different in CSR circuit 150 as compared with the previously described embodiments of the invention. As in the previous embodiments, the output 24 of the main amplifier 21 is connected to a capacitor 28. Instead of the small sensing resistor used in the previous embodiments however, the sensing impedance in CSR circuit 150 comprises a second integrated solid-state amplifier 151 having an inverting input 152 that is connected to capacitor 28 at a terminal 154. Amplifier 151 has a noninverting input 153 that is returned to the reference ground plane. The output terminal 155 of amplifier 151 is connected to the noninverting input 23 of the main amplifier 21 by an AC rate-limiting feedback circuit including, in series therewith, the parallel combination of the two threshold-establishing diodes 32 and 33. The noninverting input 23 of the main amplifier 21 is also connected to a resistor 156 that is returned to ground. A variable resistor 157 is connected between terminals 154 and 155 as a part of the rate-limiting feedback circuit.

The basic operation of CSR circuit 150 is generally similar to the other CSR circuits described above, particularly the CSR circuit 40 of FIG. 5. An input signal supplied to terminal 35 of CSR 150 (FIG. 13) is amplified by amplifier 21 and begins to charge capacitor 28. The charging current for capacitor 28 produces an output voltage, at the output terminal 155 of amplifier 151, that is a function of the rate of change of the input signal to the CSR circuit. However, capacitor 28 appears to be grounded, because terminal 153 is returned to ground; thus, the rate signal is not in series with the CSR output voltage. Nevertheless, the overall operation is essentially the same as in the previously described CSR circuits. CSR circuit 150, however, can be adjusted more precisely and accurately, with respect to the slewing rate of the circuit, by varying resistor 157.

FIG. 14 illustrates a differentiator or high-pass filter circuit 160 utilizing a constant slew rate circuit constructed in accordance with the present invention. The constant slew rate circuit that is incorporated in differentiator 160 is the CSR circuit 20A of FIG. 3 and hence need not be described in detail. In addition to the CSR circuit, differentiator 160 includes an additional solid-state integrated amplifier 161 having an inverting input 162, a noninverting input 163, and an output 164. The input terminal 165 for differentiator 160 is connected to the inverting input 162 of amplifier 161 by a series resistor 166. The noninverting input for amplifier 161 is returned to ground through a resistor 167. The output 164 of amplifier 161, which is also the output for the complete differentiator 160, is connected to the input terminal 25 of CSR circuit 20A, whereas the output terminal 24 of the CSR circuit is connected back to the inverting input 162 of amplifier 161.

As will be apparent from FIG. 14, CSR circuit 20A functions as an integrator connected in a negative feedback circuit for amplifier 161, thus providing a differentiating circuit that constitutes a high-pass filter. It should be recognized that similar differentiators can be constructed with the other CSR circuits described above; thus, if the CSR circuit 40 is substituted for circuit 20A in FIG. 14, the only additional change necessary is to shift the return connection from the output 24 of the CSR circuit to the noninverting input 163 of amplifier 161 instead of to the inverting input 162.

FIG. 15 illustrates a wave-shaping filter circuit 170 that may be substituted for the second CSR circuit 20B in a circuit of the kind described above in conjunction with FIG. 10, being utilized to produce a sinusoidal output signal in response to an input signal of triangular waveform. The wave-shaping filter 170 comprises an integrated solid-state amplifier 171 having an inverting input 172, a noninverting input 173 and an output 174 that constitutes the output terminal for the circuit. The input terminal 175 for filter 170 is connected to the noninverting amplifier input 173 by a series resistor 176. The output terminal 174 of the amplifier is connected to a resistor 177 that is in turn connected to a resistor 178, resistor 178 being returned to ground. The center terminal 179 of the voltage divider afforded by resistors 177 and 178 is connected back to the noninverting input 173 of amplifier 171 through the parallel combination of two diodes 181 and 182, the diode connections being made with reverse polarities.

In operation, a triangular waveform input signal supplied to terminal 175 in filter 170, upon exceeding the forward voltage drop across one of the diodes 181 and 182, depending upon the polarity of the applied signal, produces an output signal of corresponding polarity at the output terminal 174 of the circuit. Because the bias on diodes 181 and 182 is derived from the output 174 of the filter, the system is reentrant and approaches a condition in which a sinusoidal bias on the diodes 181 and 182 produces a sinusoidal output signal which in turn further biases the diodes, and so on. Upon application of a triangular waveform signal to input terminal 175, filter 170 will produce an output signal at terminal 174 that is a close approximation of a sine wave; a total distortion of one-half percent or less is typical.

The wave-shaping filter 170 of FIG. 15 is especially valuable in VOR receivers and similar applications because the phase shift is exactly zero regardless of frequency and because the filter is highly effective in suppressing unwanted harmonics. Total harmonic distortion is at least 50 db. below the fundamental. The output of the wave-shaping filter is a sine wave of relatively high purity with complete phase fidelity, which is quite important in a system such as a VOR receiver in which critical information is presented in the form of phase variations in a received signal.

Figure 16:
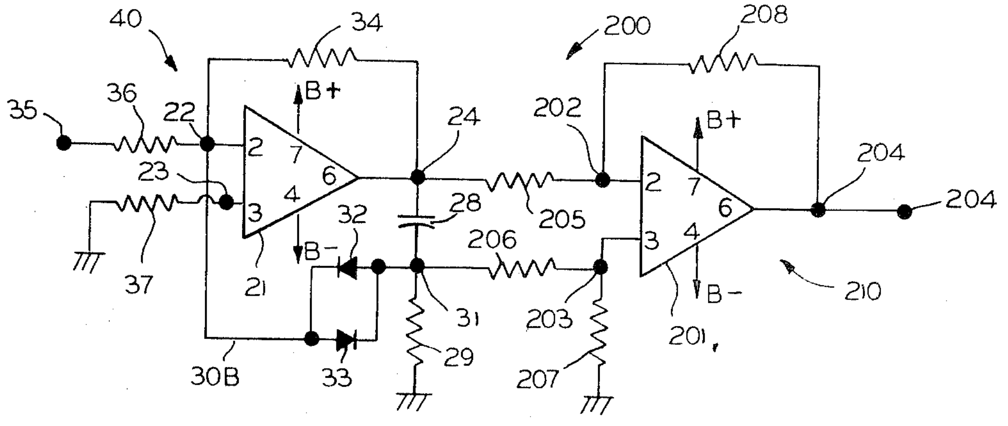
FIG. 16 is a schematic diagram of another embodiment of the invention, based on the circuit of FIG. 5.

FIG. 16 illustrates a CSR circuit 200 comprising a further embodiment of the present invention that is based upon the CSR circuit 40 (FIG. 5) but that effectively compensates for the drop across the diodes in the rate-limiting feedback circuit. The input stage 40 of CSR circuit 200 thus comprises an integrated solid-state operational amplifier 21 having an inverting input 22 connected by a resistor 36 to the input terminal 35 for the CSR circuit. The noninverting input 23 of the I–C amplifier 21 is connected to a resistor 37 that is returned to system ground.

The output terminal 24 of amplifier 21 is connected to a capacitor 28 that is returned to system ground through a sensing resistor 29. A rate-limiting feedback circuit 30B connects the common terminal 31 of capacitor 28 and resistor 29 back to the inverting input 22 of amplifier 21. A DC stabilization feedback circuit, comprising a resistor 34, connects the output terminal 24 of amplifier 21 back to the inverting input 22 of the amplifier.

CSR circuit 200 further includes a second or compensation stage 210 comprising an integrated circuit solid-state amplifier 201 having an inverting input 202, a noninverting input 203, and an output 204, output 204 being the output terminal for the CSR circuit. The output terminal 24 of the initial stage 40 is connected to the inverting input 202 of amplifier 201 through a series resistor 205. The noninverting input 203 of amplifier 201 is connected to the center terminal of a voltage divider comprising two resistors 206 and 207; resistor 206 is connected to terminal 31 in stage 40 and resistor 207 is returned to system ground. A feedback connection is made from output terminal 204 back to the inverting input 202 of amplifier 201 through a resistor 208.

Operation of the initial stage 40 in CSR circuit 200 is as described above in connection with FIGS. 5 and 6. For slow-changing input signals (low slew rates) the voltage drop across resistor 29, which is proportional to the slew rate, may be less than the voltage necessary to cause one of the diodes 32 and 33 to conduct. For such signals, the rate feedback circuit 30B is effectively blocked and amplifier 21 functions as a unity gain inverting amplifier. These slow-changing signals are also translated through the second stage amplifier 201 without rate limitation, retaining their original waveform.

For input signals having higher slew rates, the voltage across resistor 29 reaches the diode drop potential and diodes 32, 33 conduct the rate feedback signal. The gain of amplifier 21 is controlled so that the drop across resistor 29 exactly matches the diode drop, establishing a constant, limited slew rate output. The DC gain of the circuit is unity and circuit operation is extremely stable. However, as discussed above, the voltage drop across diodes 32 and 33 introduces a minor problem with respect to high-frequency suppression; at high frequencies the small square wave component caused by the voltage drop across the two diodes is more perceptible than at low frequencies. Moreover, the attenuation curve drops off to a constant level and does not quite reach zero.

In analyzing the operation of the second stage 210 of CSR circuit 200, it should be remembered that for an operational amplifier the voltage difference at the input terminals is essentially zero, and that there is negligible current flow into the input terminals. Since the noninverting input terminal 203 of amplifier 201 is at system ground potential, the inverting input terminal 202 is also at ground. Thus, the drop across diodes 32 and 33 appears at the other terminal 31 of the diodes relative to ground. The square wave diode drop is in phase with the output signal of amplifier 21 and must be subtracted from that signal to afford a clean constant slope triangular wave output.

The second amplifier 201 in CSR circuit 200 is connected as a 1:1 inverting amplifier in stage 210. The diode drop signal is fed into the noninverting input terminal 203 of amplifier 201 and consequently is subtracted from the output signal supplied to the inverting input 202 of the same amplifier. Resistors 205 and 206 are of equal impedance and hence comprise a 2:1 voltage divider. This is necessary because the gain of amplifier 201 is two for noninverting input signals. It is thus apparent that the square wave diode voltage drop signal is effectively subtracted from the output signal of the first stage 40 of CSR circuit 200, in the second stage 210, producing a clean, constant slope output signal at terminal 204. Thus, the minor distortion introduced by the diodes in the rate feedback circuit (discussed above in connection with FIG. 4) is entirely eliminated in the CSR circuit 200.

To afford an explicit example of the CSR circuit 200, specific circuit data are set forth below for 30 Hz. operation. This information is presented solely by way of illustration and in no sense as a limitation on the invention.

| | |
|---|---|
| Resistors 34, 36, 37, 205–208 | 10 kilohms |
| Resistor 29 | 470 ohms |
| Capacitor 28 | 1 microfarad |
| Amplifiers 21, 201 | uA741 Fairchild |
| Diodes 32, 33 | 1N914 |

From the foregoing description, it will be apparent that the CSR circuits of the present invention are susceptible of a number of further modifications and combinations that do not depart in any way from the basic inventive concept. Thus, the DC stabilization feedback circuits of FIGS. 8 and 9 may be utilized with the basic CSR circuit 40 of FIG. 5 as well as with the CSR circuits of FIGS. 1 and 2 and can also be utilized in combination with the different AC rate feedback circuits of FIGS. 12 and 13. A compensation stage can be added to the basic CSR circuit 20A of FIG. 3 to eliminate the effect of the forward drop of the threshold diodes in the rate feedback circuit, as done with the CSR circuit 40 in the circuit shown in FIG. 16. Other variations in the two feedback circuits can be made, under the invention, as long as the basic configuration for the CSR circuit is maintained. As noted above, the wave-shaping filter 170 of FIG. 15 could be utilized in conjunction with any of the CSR circuits described herein.

The circuits of the present invention provide a constant slewing rate that is essentially independent of variations in the operating frequency of the input signals supplied thereto. In those embodiments of the invention patterned after the basic circuit 40 of FIG. 5, the slewing rate of the output signal is independent of the amplitude of the input signal; for circuits based on CSR circuits 20 and 20A (FIGS. 1 and 3), the slewing rate is a function of the input signal amplitude. The CSR circuits of the invention find particular utility as low-pass, band-pass and high-pass filters, and as integrators and differentiators, that can afford substantially zero phase distortion as defined above. The circuits of the invention are also particularly useful in analog computers and similar applications in which a signal of rectangular or triangular waveform must be converted to a sine wave signal. Nevertheless, the circuits of the invention are quite simple and economical in construction and are not dependent upon precision selection of circuit components.

I claim:

1. A constant slew rate circuit, which produces an output signal of constant linear slope upon application thereto of a step function input signal of either positive-going or negative-going nature, comprising:

a main integrated solid-state amplifier having an inverting input, a noninverting input, and an output;

first feedback means comprising a capacitor connected to said output of said main amplifier, a small, nonreactive sensing impedance connected from said capacitor to a plane of reference potential, and an AC rate feedback circuit connected from the common terminal of said capacitor and said sensing impedance to one input of said main amplifier; and second feedback means comprising a negative feedback DC stabilization circuit connected from said main amplifier output to one of said inputs of said main amplifier, said negative feedback circuit having an impedance at least an order of magnitude greater than said sensing impedance.

2. A constant slew rate circuit according to claim 1 in which said rate feedback circuit includes threshold means, symmetrical with respect to signals of opposite polarity, precluding any effective rate-limiting, AC feedback to said main amplifier until the voltage drop across said sensing impedance exceeds a predetermined minimum threshold voltage.

3. A constant slew rate circuit according to claim 2 in which said threshold means comprises a pair of diodes connected in parallel with each other and in opposed polarities, interposed in said rate feedback circuit, and in which said minimum threshold voltage in the forward breakdown voltage of said diodes.

4. A constant slew rate circuit according to claim 1 in which said negative feedback DC stabilization circuit comprises a large resistance connected from the output of said main amplifier to said inverting input of said main amplifier.

5. A constant slew rate circuit according to claim 1 in which said negative feedback DC stabilization circuit comprises a DC amplifier having an input connected to the output of said main amplifier and an output connected to one input of said main amplifier.

6. A constant slew rate filter according to claim 5 in which said DC amplifier has a parallel RC circuit connected between its input and its output and functions as a low-pass filter, minimizing AC feedback to the main amplifier through the DC feedback circuit.

7. A constant slew rate filter according to claim 5 in which said DC amplifier includes an AC bypass to a plane of reference potential to preclude AC feedback to the main amplifier through the DC feedback circuit.

8. A constant slew rate filter according to claim 1 in which said negative DC feedback circuit includes limiting means, symmetrical with respect to signals of opposite polarity, precluding any effective negative DC feedback to said main amplifier until the voltage at the output of said main amplifier exceeds a predetermined minimum threshold voltage.

9. A constant slew rate circuit according to claim 8 in which said limiting means comprises a pair of diodes connected in parallel with each other and in opposed polarities, interposed in said negative DC feedback circuit, and in which the minimum threshold voltage is the forward breakdown voltage of said diodes.

10. A constant slew rate circuit according to claim 1 in which said first feedback means includes signal-controlled means for changing the effective impedance of said sensing impedance to thereby adjust the slewing rate of the circuit.

11. A constant slew rate circuit according to claim 10 in which said sensing impedance comprises a sensing resistor and in which said signal-controlled means comprises a semiconductor discharge device having input and output electrodes connected in parallel with said sensing resistor and having a control electrode for receiving a control signal to vary the conductivity of said device and thereby vary the total effective impedance between said capacitor and said plane of reference potential.

12. A constant slew rate circuit according to claim 11 in which said discharge device is a field-effect transistor.

13. A constant slew rate circuit according to claim 1 in which said sensing impedance comprises:

a second integrated solid-state amplifier having an inverting input, a noninverting input, and an output, one input of said second amplifier being connected to said capacitor, the other input of said second amplifier being connected to said plane of reference potential, and the output of said second amplifier being connected back to one input of said main amplifier;

and a resistor connected between said one input and said output of said second amplifier.

14. A constant slew rate circuit according to claim 13 in which said rate feedback circuit includes threshold means precluding any effective rate-limiting AC feedback to said main amplifier until the voltage drop across said sensing impedance exceeds a predetermined minimum threshold voltage.

15. A constant slew rate circuit according to claim 14 in which said threshold means comprises a pair of diodes connected in parallel with each other and in opposed polarities, interposed in said rate feedback circuit, and in which said minimum threshold voltage is the forward breakdown voltage of said diodes.

16. A constant slew rate circuit according to claim 1, and further comprising an additional integrated solid-state amplifier having an output connected to one input of said main amplifier and having an input connected to said output of said main amplifier, said main amplifier affording a negative feedback circuit for said additional amplifier to provide a differentiating circuit.

17. A constant slew rate circuit according to claim 2 and further including an output compensation stage, comprising a differential adding circuit, having two inputs, one connected to the output of said main amplifier and the other to said rate feedback circuit, to compensate for variations in the output of said circuit introduced by the presence of said threshold means in said rate feedback circuit.

18. A constant slew rate circuit according to claim 17, in which said output compensation stage comprises a second integrated solid-state amplifier, and said two inputs to said compensation stage comprise inverting and noninverting input terminals for said second amplifier.

19. A constant slew rate circuit according to claim 18, in which the inverting input to said second amplifier is connected to the output of said main amplifier through a first resistor and the noninverting input to said second amplifier is connected to said rate feedback circuit through a second resistor and to system ground through a third resistor, all three resistors being of equal resistance.

20. A wave-shaping circuit for converting an input signal of rectangular waveform to an output signal of sinusoidal waveform, with zero phase distortion, over a wide range of input frequencies, comprising a first stage for converting said rectangular waveform input signal to an intermediate signal of triangular waveform and a second stage for converting said triangular waveform intermediate signal to a sinusoidal output signal, at least one of said first and second stages being a constant slew rate circuit comprising:

an integrated solid-state amplifier having an inverting input, a noninverting input, and an output;

first feedback means comprising a capacitor connected to said output of said amplifier, a low, nonreactive sensing impedance connected from said capacitor to a plane of reference potential, and a rate-limiting AC feedback circuit connected from the common terminal of said capacitor and said sensing impedance to one input of said amplifier; and second feedback means comprising a negative feedback DC stabilization circuit connected from said amplifier output to one of said inputs of said amplifier, said negative feedback circuit having an impedance at least an order of magnitude greater than said sensing impedance.

21. A wave-shaping circuit according to claim 20, in which said constant slew rate circuit comprises the first stage of said wave-shaping circuit and said second stage comprises:

an integrated solid-state second stage amplifier having at least one input terminal and an output terminal;

an input circuit comprising a pair of diodes connected in parallel with each other from said input terminal to a shunt input resistance, said shunt input resistance being returned to a plane of reference potential;

and a bias resistance connected from the common terminal of said diodes and said shunt input impedance to said output terminal of said second stage amplifier.

22. A wave-shaping filter for converting an input signal of triangular waveform to an output signal of sinusoidal waveform, with zero phase distortion and without substantial loss of amplitude information, comprising:

an integrated solid-state amplifier having at least one input terminal and an output terminal;

an input circuit comprising a pair of diodes connected in parallel with each other from said input terminal to a shunt input resistance, said shunt input resistance being returned to a plane of reference potential;

and a bias resistance connected from the common terminal of said diodes and said shunt input impedance to said output terminal of said amplifier.

23. A wave-shaping filter according to claim 22, in which said amplifier has an inverting input terminal and a noninverting input terminal, in which said input circuit is connected to the noninverting input terminal of said amplifier, and in which said inverting input terminal is returned to said plane of reference potential.

24. A signal processing circuit comprising:

a solid-state amplifier having an input and an output;

rate-sensing means, comprising a low, nonreactive impedance AC coupled to the output of said amplifier and connected to a plane of reference potential, for developing a rate-limiting signal representative of the rate of change of the output signal voltage from said amplifier;

and negative feedback means coupling said rate-sensing means to the input of said amplifier to limit the output signal voltage of said amplifier to a predetermined constant rate of change for both positive-going and negative-going signals.

25. A signal processing circuit according to claim 24 in which said feedback means includes threshold means precluding any effective rate-limiting feedback to the input of said amplifier until the rate of change of said given parameter of the output signal from said amplifier exceeds a given threshold rate, whereby said circuit operates as a faithful follower for input signals having a rate of change below a given value and as a constant slew rate circuit for input signals having a rate of change exceeding said given value.

* * * * *